(12) United States Patent
Mizuguchi

(10) Patent No.: US 9,325,424 B2
(45) Date of Patent: Apr. 26, 2016

(54) OPTICAL PHASE COMPENSATION DEVICE, OPTICAL RECEIVER, AND OPTICAL PHASE COMPENSATION METHOD

(71) Applicant: FUJITSU LIMITED, Kawasaki-shi, Kanagawa (JP)

(72) Inventor: Noriaki Mizuguchi, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 14/278,559

(22) Filed: May 15, 2014

(65) Prior Publication Data

US 2014/0363176 A1   Dec. 11, 2014

(30) Foreign Application Priority Data

Jun. 11, 2013   (JP) ................................. 2013-122822

(51) Int. Cl.
*H04B 10/06*   (2006.01)
*H04B 10/61*   (2013.01)

(52) U.S. Cl.
CPC .......... *H04B 10/6165* (2013.01); *H04B 10/611* (2013.01)

(58) Field of Classification Search
CPC ... H04B 10/611; H04B 10/6165; H04B 10/61
See application file for complete search history.

(56) References Cited

U.S. PATENT DOCUMENTS

| | | | | |
|---|---|---|---|---|
| 5,666,352 A | * | 9/1997 | Ohgoshi | ................ H04B 1/707 370/206 |
| 2010/0239269 A1 | * | 9/2010 | Sugitani | ................ H04B 10/61 398/208 |
| 2010/0303474 A1 | * | 12/2010 | Nakashima | ............ H04B 10/61 398/210 |
| 2014/0286650 A1 | * | 9/2014 | Ogiwara | ............ H04B 10/6164 398/208 |

FOREIGN PATENT DOCUMENTS

JP   2010-220100   9/2010

* cited by examiner

*Primary Examiner* — Dzung Tran
(74) *Attorney, Agent, or Firm* — Staas & Halsey LLP

(57) ABSTRACT

An optical phase compensation device included in an optical receiver employing an intradyne detection method, includes a first optical phase error calculator configured to calculate a first optical phase error by averaging signal symbols of a first number of input main signals, a second optical phase error calculator configured to calculate a second optical phase error by averaging signal symbols of a second number of the main signals, wherein the second number is smaller than the first number, and a subtractor configured to subtract, from optical phase components of the main signals, one of a difference between the first optical phase error and the second optical phase error and a value obtained by multiplying the difference by a gain relative to the difference.

8 Claims, 15 Drawing Sheets

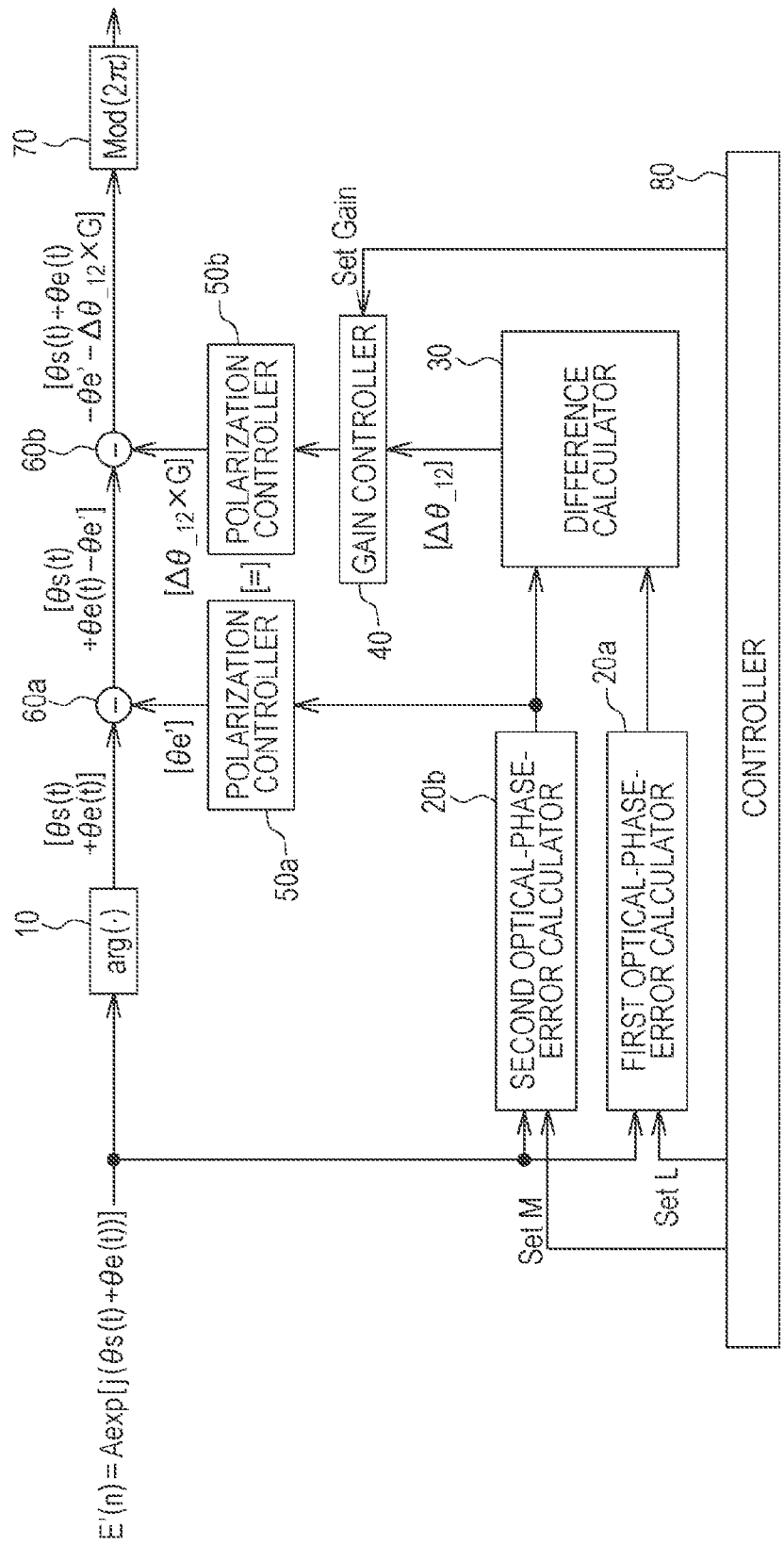

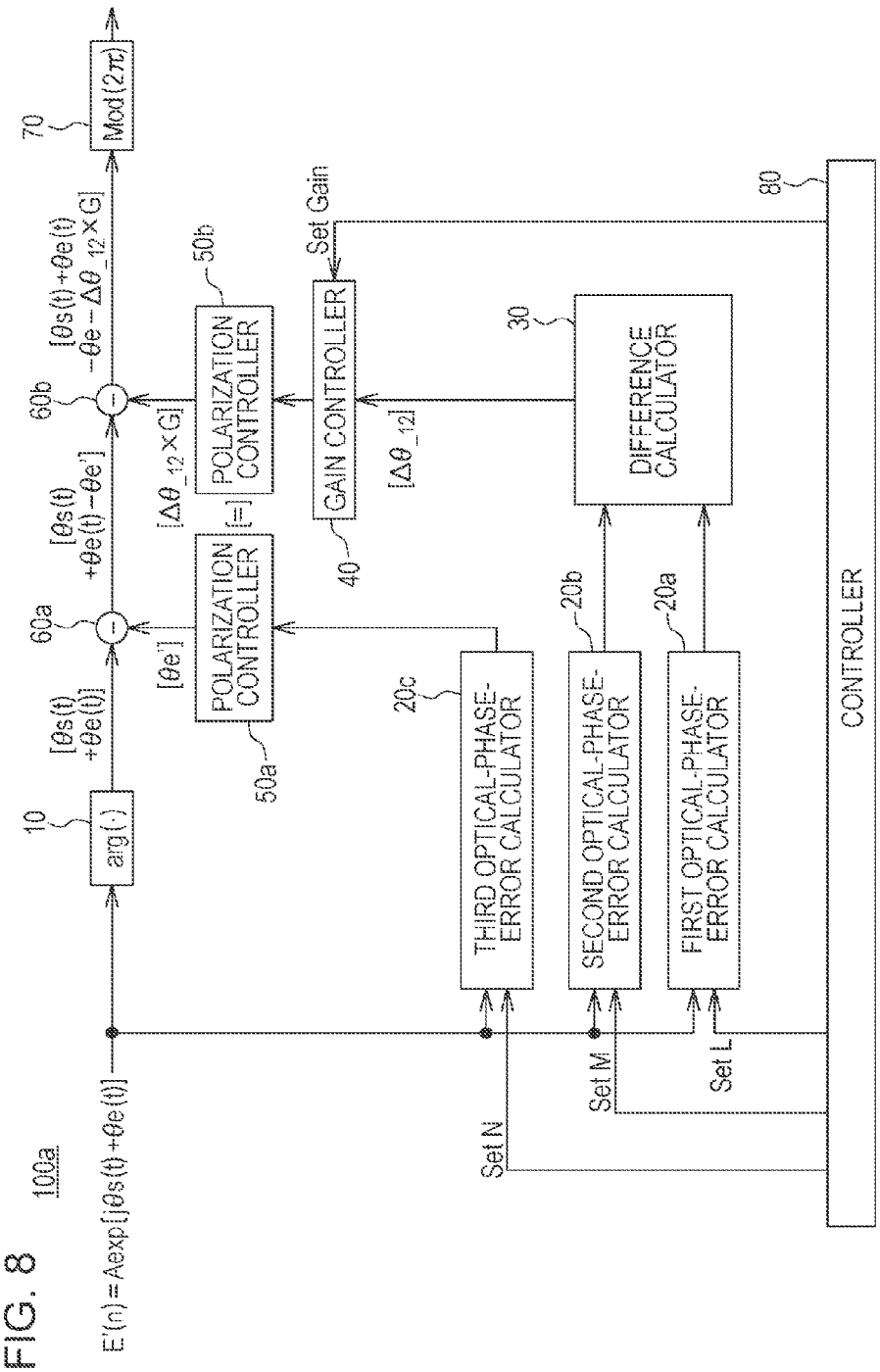

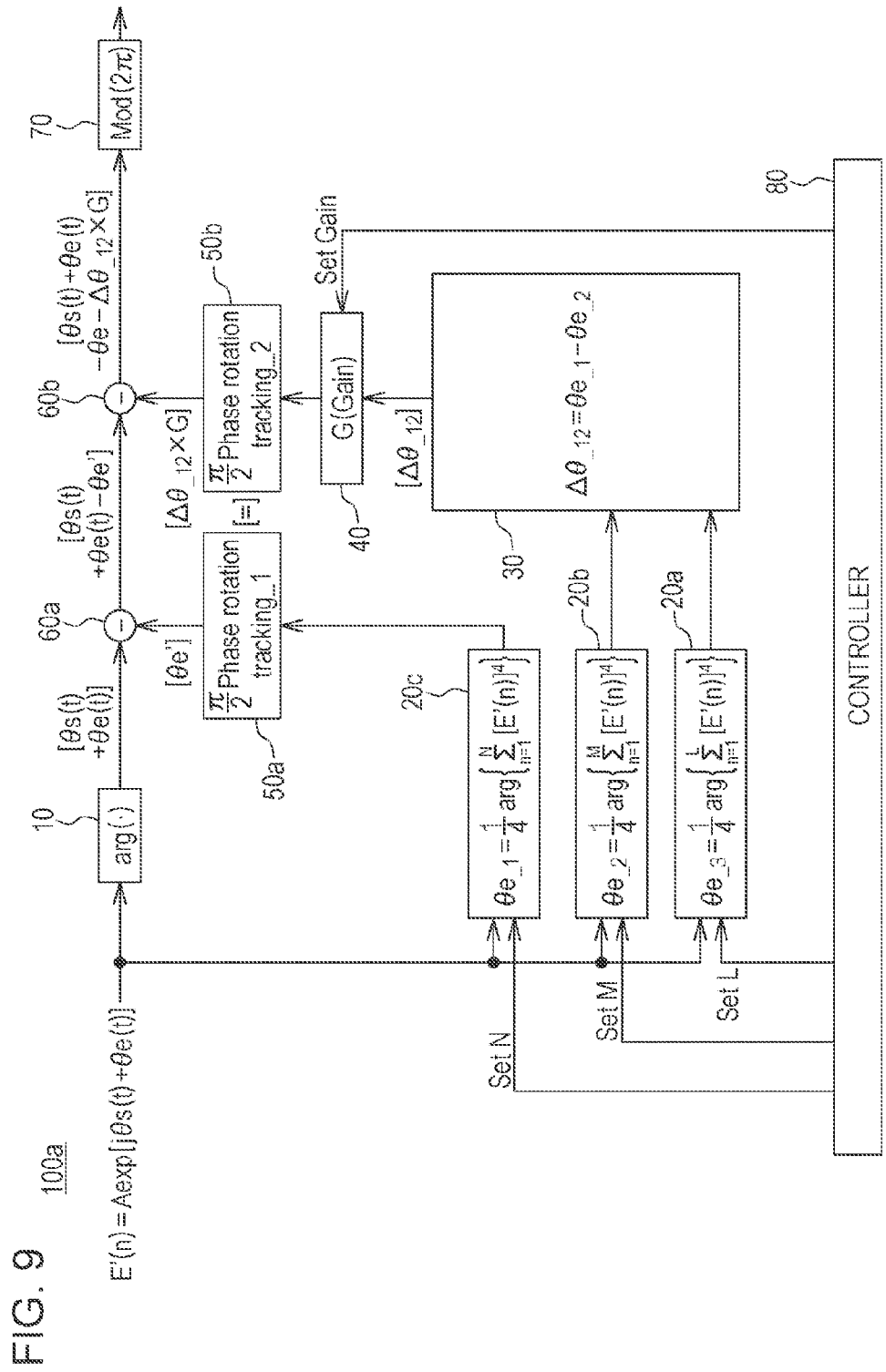

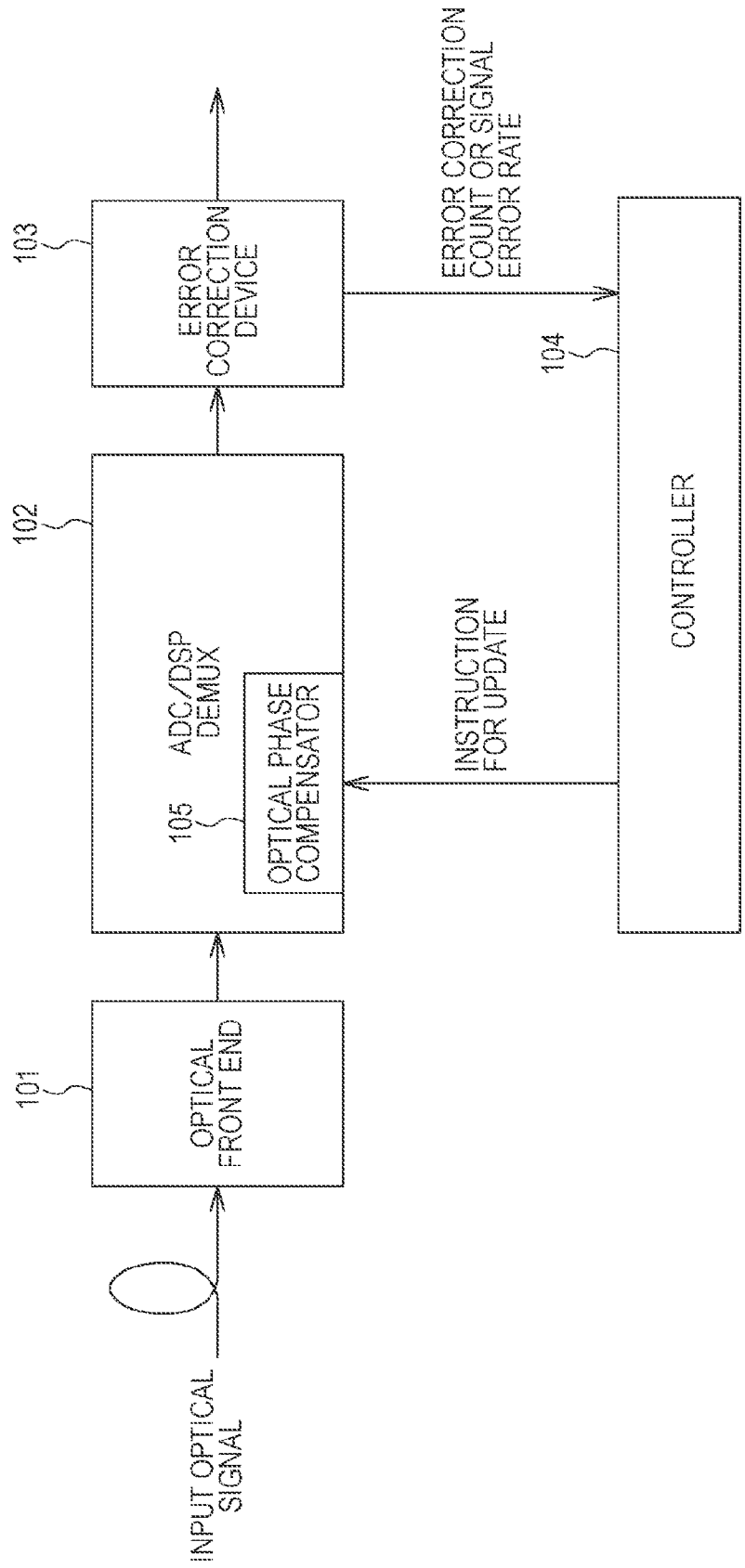

OPTICAL PHASE COMPENSATION DEVICE, OPTICAL RECEIVER, AND OPTICAL PHASE COMPENSATION METHOD

CROSS-REFERENCE TO RELATED APPLICATION

This application is based upon and claims the benefit of priority of the prior Japanese Patent Application No. 2013-122822, filed on Jun. 11, 2013, the entire contents of which are incorporated herein by reference.

FIELD

The embodiments discussed herein are related to an optical phase compensation device, an optical receiver, and an optical phase compensation method.

BACKGROUND

A technique employing an optical phase modulation method in a WDM transmission system has been developed. Japanese Laid-open Patent Publication No. 2010-220100 discloses a phase synchronization device for a coherent optical receiver employing an intradyne detection method, for example.

SUMMARY

According to an aspect of the invention, an optical phase compensation device included in an optical receiver employing an intradyne detection method, includes a first optical phase error calculator configured to calculate a first optical phase error by averaging signal symbols of a first number of input main signals, a second optical phase error calculator configured to calculate a second optical phase error by averaging signal symbols of a second number of the main signals, wherein the second number is smaller than the first number, and a subtractor configured to subtract, from optical phase components of the main signals, one of a difference between the first optical phase error and the second optical phase error and a value obtained by multiplying the difference by a gain relative to the difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a block diagram illustrating a configuration of an optical phase compensation device according to a first embodiment;

FIG. 8 is a block diagram illustrating a configuration of a phase compensation device according to a second embodiment;

FIG. 9 is a diagram illustrating calculation processes performed by sections of the optical phase compensation device according to the second embodiment;

FIG. 11 is a block diagram illustrating an entire configuration of an optical receiver according to a third embodiment;

DESCRIPTION OF EMBODIMENTS

In order to compensate for an optical phase error caused by a nonlinear optical effect or the like, the number of signal symbols to be subjected to averaging in a process of calculating the optical phase error is preferably changed. However, a signal error may occur after the number of signal symbols to be subjected to averaging is changed. (The term "optical phase error" means shift of a phase of an optical signal.)

Hereinafter, an optical phase compensation device capable of appropriately compensating for an optical phase error, an optical receiver, a network management system, and an optical phase compensation method will be described with reference to the accompanying drawings.

Figure 1:
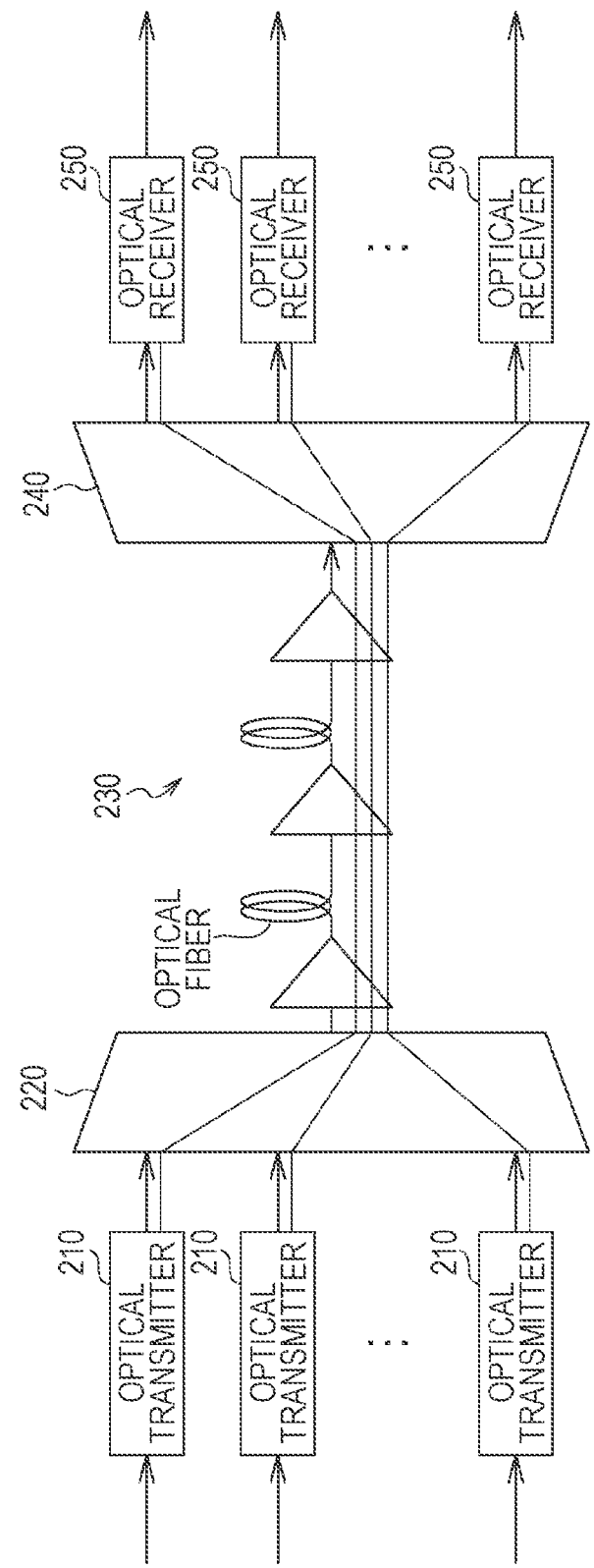
FIG. 1 is a block diagram illustrating an entire configuration of a WDM transmission system.

Before description of embodiments, a WDM transmission system will be schematically described. FIG. 1 is a block diagram illustrating an entire configuration of a WDM transmission system 200. The WDM transmission system 200 includes a plurality of optical transmitters 210, a wavelength multiplexer 220, an optical transmission line 230, a wavelength demultiplexer 240, a plurality of optical receivers 250, and the like. In the optical transmission line 230, optical fibers are relayed by optical amplifiers.

The different optical transmitters 210 generate optical signals of different wavelengths and supply the optical signals which have been subjected to phase modulation to the wavelength multiplexer 220. The wavelength multiplexer 220 multiplexes the phase modulated signals which have been input. An optical wavelength multiplexed signal obtained by the multiplexing is supplied through the optical transmission line 230 to the wavelength demultiplexer 240. The wavelength demultiplexer 240 divides the optical wavelength multiplexed signal into optical signals having respective wavelengths. The optical receivers 250 demodulate the optical signals. The optical signals in the WDM transmission system 200 are modulated by a dual polarization quadrature phase shift keying (DP-QPSK) method using four-level phase modulation, for example. Although signals are transmitted from the optical transmitters 210 to the optical receivers 250 in FIG. 1, signals may be transmitted in a bidirectional manner using optical transmitter-receiver devices.

Figure 2:
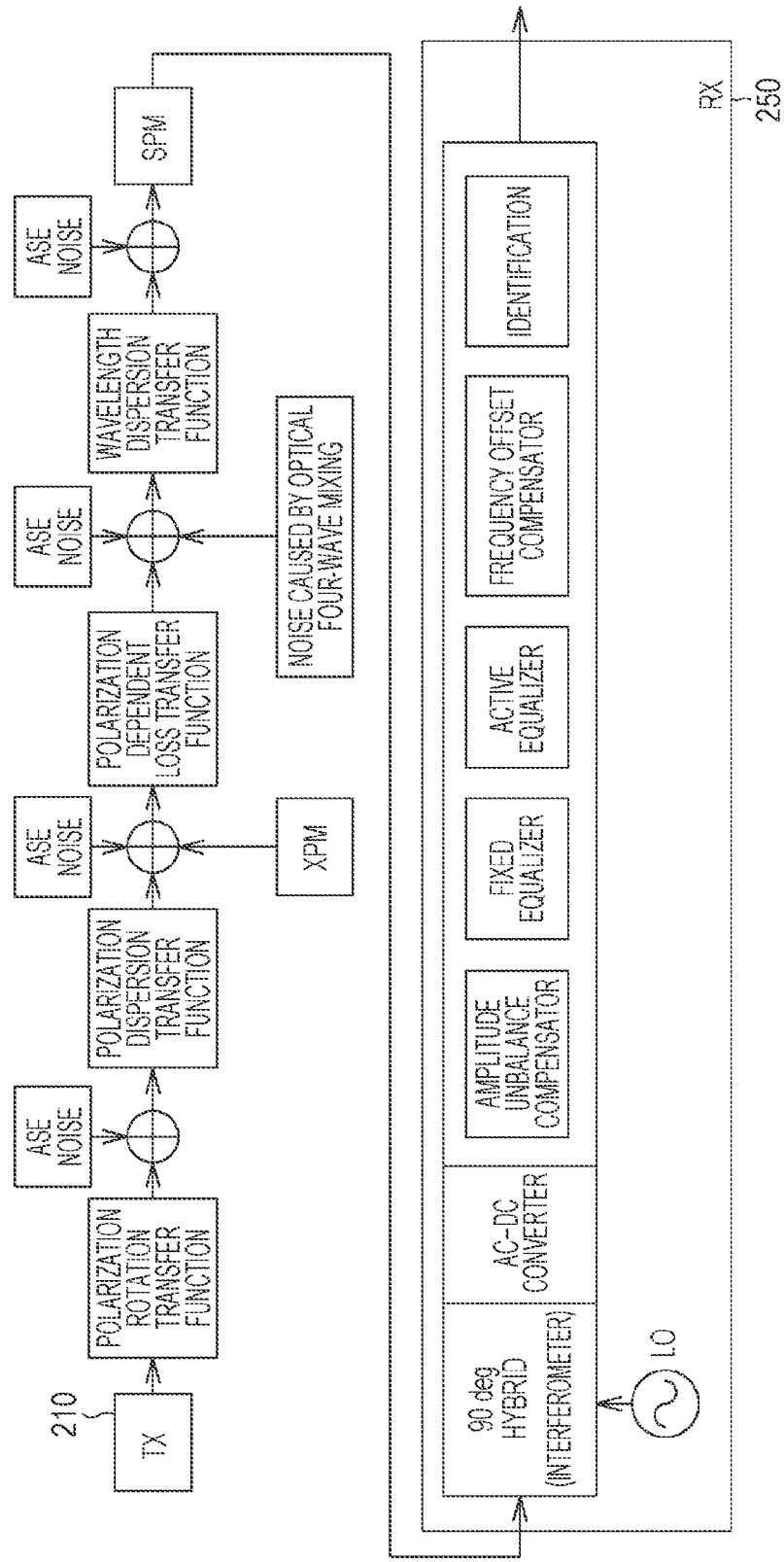
FIG. 2 is a block diagram illustrating a configuration of an optical receiver.

FIG. 2 is a block diagram illustrating a configuration of the optical receivers 250. In FIG. 2, examples of optical phase errors to be superimposed in a path from the optical transmitters 210 to the optical receivers 250 are illustrated. Although actual optical phase errors are represented by distributed constants since they are generated in various locations, they are represented as a simple model in FIG. 2 in which elements of the optical phase errors are represented by lumped constants. In the WDM transmission system 200, various optical phase errors are generated between the optical transmitters 210 and the optical receivers 250. Such optical phase errors may include an optical phase error caused by a nonlinear optical effect or the like generated at a time of optical transmission.

For example, an optical phase error may occur due to self phase modulation (SPM) in which an optical signal modulates an optical phase of itself. The optical phase error caused by the SPM depends on a modulation method, characteristics of power and the like, a bit sequence, and the like. In addition, an optical phase error may occur due to cross-talk phase modulation (XPM) in which an adjacent optical channel interferes. The optical phase error caused by the XPM depends on modulation methods, characteristics of power and the like, bit sequences, and the like of optical channels which are adjacent to each other. Furthermore, an optical phase error may occur due to optical four-wave mixing in which channels which are adjacent to each other interfere with each other. By the optical four-wave mixing, in addition to the occurrence of the optical phase error, intensity of an optical signal is deteriorated. Moreover, an optical phase error may occur due to optical noise (amplified spontaneous emission (ASE)) generated by an optical amplifier. The ASE deteriorates an optical signal by superimposing white noise of a broadband on an optical signal. Note that optical phase errors to be superimposed are not limited to these.

The optical phase errors caused by the ASE, the SPM, the XPM, and the optical four-wave mixing are generated in accordance with characteristics and a configuration of lines of a network of an optical transmission path including the WDM method. Different types of optical phase error are generated in different network configurations. That is, different optical phase errors occur depending on characteristics and a configuration of a transmission path. For example, when a configuration of a line is changed due to not only switching between lines of a main signal channel but also switching between lines of a channel which is adjacent to the main signal channel in the WDM transmission method, an optical phase error to be superimposed in the main signal is changed.

As the optical receivers 250, a configuration of optical receivers employing the DP-QPSK method will be described. Each of the receivers uses an interferometer such as a 90° hybrid, for example, so that an optical signal input to the optical receiver 250 (hereinafter referred to as a "main signal") and local oscillation (LO) light interfere with each other. Each of the optical receivers 250 performs current/voltage conversion and analog/digital conversion on current obtained by photoelectric conversion performed on the obtained light so as to obtain a digital electric signal. The optical transmission line 230 assigns a polarization rotation transfer function, a polarization dispersion transfer function, a polarization dependent loss transfer function, a wavelength dispersion transfer function, and the like to an optical wavelength multiplexed signal. Each of the optical receivers 250 compensates for waveform distortion by assigning inverse functions of the transfer functions using an amplitude unbalance compensator, a fixed equalizer, an active equalizer, and the like.

The optical receivers 250 employ an intradyne detection method. In the intradyne detection method, the main signal and the LO light interfere with each other in a state in which an optical frequency of the main signal and an optical frequency of the LO light do not perfectly match with each other so that a demodulation signal is obtained. Each of the optical receivers 250 is configured such that an optical phase error generated owing to a difference between optical frequencies of an optical signal is calculated and compensated for. The configuration in which an optical phase error is calculated is referred to as "frequency offset compensation". In a process of calculating an optical phase error, arbitrary N symbols of an optical signal on which an optical phase error is superimposed are set as targets of averaging and the optical phase error is calculated by a slip averaging process.

Figure 3A:
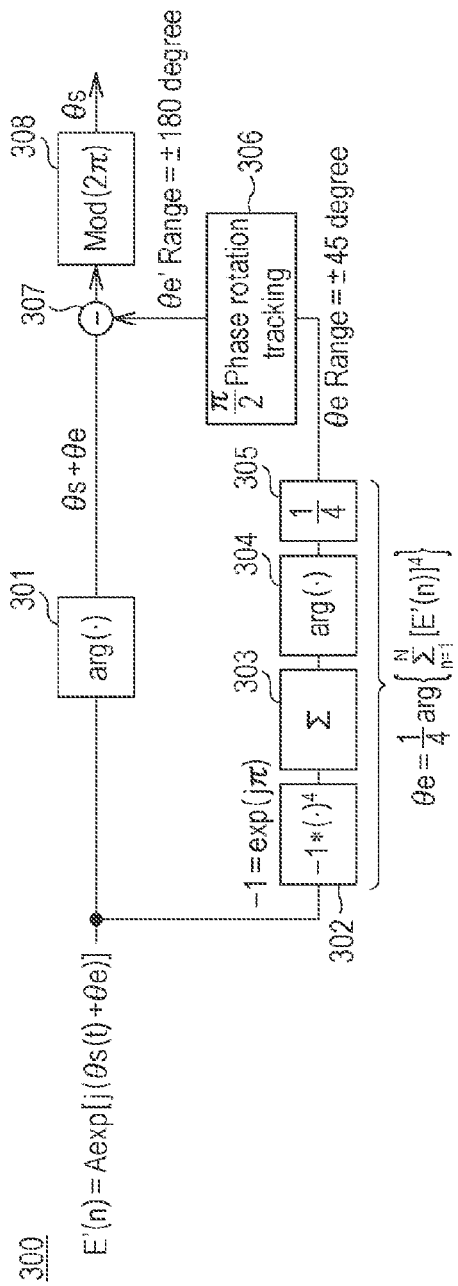
FIGS. 3A and 3B are block diagrams illustrating a configuration of an optical phase compensation device of a comparative example.
Figure 3B:
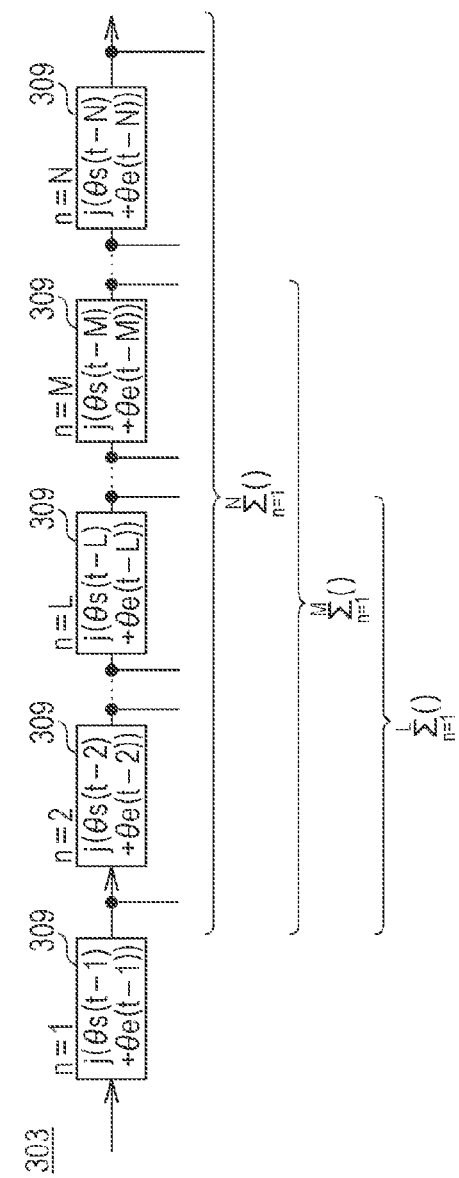

FIGS. 3A and 3B are block diagrams illustrating a configuration of an optical phase compensation device 300 of a comparative example. The optical phase compensation device 300 corresponds to a frequency offset compensator in the configuration of FIG. 2. The optical phase compensation device 300 is configured such that optical phase errors are calculated by an averaging process performed on arbitrary N symbols of main signals on which an optical phase error is superimposed. For example, since the optical phase errors of the arbitrary N symbols of the main signals are subjected to slip averaging and smoothing, even if an optical phase error of one of the signal symbols is abnormal, the optical phase errors are stably compensated for while the abnormality is not sensitively detected.

In FIG. 3A, mixed waves ($\theta s(t)=\pi/4$, $3\pi/4$, $5\pi/4$, and $7\pi/4$: phase modulation components of signal symbols and $\theta e(t)$: optical phase errors) on which optical phase errors are superimposed are input to the optical phase compensation device 300 as main signals. A deviation angle calculator 301 extracts phase angles ($\theta s(t)+\theta e(t)$) from the mixed waves. A biquadratic operation unit 302 and an averaging unit 303 quadruple the phase angles of the mixed waves so as to obtain $\theta s(t)$ of $\pi$, $3\pi$, $5\pi$, and $7\pi$ so that signal phases are removed and "$4 \times \theta e(t)$" remains. In this case, the biquadratic operation unit 302 and the averaging unit 303 average N symbols of N input signals. A deviation angle calculator 304 extracts the phase angles. A quarter divider 305 divides $4 \times \theta e$ by 4 so as to obtain an optical phase error $\theta e$. A polarized wave controller 306 obtains an optical phase error $\theta e'$ by controlling a rotation angle of a polarized wave. A subtractor 307 subtracts the obtained optical phase error $\theta e'$ from the phase angles ($\theta s(t)+\theta e(t)$) of the mixed waves so as to extract signal phases $\theta s(t)$. A demodulator 308 demodulates the main signals in accordance with the obtained signal phases $\theta s(t)$.

As illustrated in FIG. 3B, the averaging unit 303 uses a plurality of shift registers 309. The optical phase compensation device 300 preferably compensates for signal symbols $\theta s(t)$ by continuously outputting the optical phase error $\theta e'$ in operation. However, if a setting of the number of signal symbols to be subjected to the averaging is changed from N to M (M is not N), recalculation is performed. In this case, the optical phase error $\theta e'$ is not properly output immediately after the recalculation, and as a result, a signal error occurs. For example, when an optical phase error is appropriately compensated for in a case of M rather than N after the network configuration of the WDM is changed in operation, the number of signal symbols is preferably changed from N to M. In this case, when the number of signal symbols is changed from N to M, traffic may temporarily fail.

The optical phase compensation device 300 performs high-speed sampling, that is, double sampling or more per one signal symbol, and calculates an optical phase error by performing slip averaging on N signal symbols. A processing speed corresponds to a bit rate of signals, e.g., 30 G baudrate in the DP-QPSK of 120 Gb/s, for example. Accordingly, the signal symbols are sampled at a speed of 60 GSa/s. An optical phase error calculator which calculates a shifting amount of a phase of an optical signal performs a calculation process of slip averaging in accordance with this speed. Note that the biquadratic operation unit 302, the averaging unit 303, the deviation angle calculator 304, and the quarter divider 305 correspond to the optical phase error calculator. Furthermore, in general, timing compensation is performed using a clock which is synchronized with a clock of the main signals by hardware such as a shift register in the calculation process of the slip averaging. Even in the calculation process, if the number of targets of the slip averaging is changed in a configuration of the hardware operating at high speed, the optical phase compensation error described above occurs since an output from the hardware is not seamlessly changed.

The components (θe(t)) of the optical phase errors of the main signals input to the optical phase compensation device 300 have various speeds (dθe/dt). Optical noises which cause optical phase errors will be briefly described below. The optical noises are classified according to frequency components of the optical noises (−dθe/dt→df). It is considered that the optical phase error components θe(t) are input after the frequency components are added to the components θe(t). In general, the frequency offset compensation represents compensation of optical phase errors generated by a first noise and a second noise below.

First Noise: an optical phase error θe caused by a difference between optical frequencies by widths of laser beams of the optical transmitters 210 and the optical receivers 250. For example, the optical phase error θe is approximately Δ2 MHz.

Second Noise: an optical phase error θe caused by a difference between an optical center frequency of laser beams of the optical transmitters 210 and an optical center frequency of laser beams of the optical receivers 250. For example, the optical phase error θe is smaller than approximately Δseveral hundreds MHz.

Third Noise: an optical phase error θe caused by a nonlinear phenomenon (self-phase modulation (SPM)). The third noise includes a considerably-high-speed frequency component.

Fourth Noise: an optical phase error θe caused by a nonlinear phenomenon (cross-phase modulation (XPM)). The fourth noise includes a considerably-high-speed frequency component.

Fifth Noise: an optical phase error θe caused by a nonlinear phenomenon (optical four-wave mixing, cross-talk, or the like). The fifth noise includes a high-speed frequency component.

Sixth Noise: an optical phase error θe caused by ASE noise. The sixth noise is white noise of broadband.

Figure 4A:
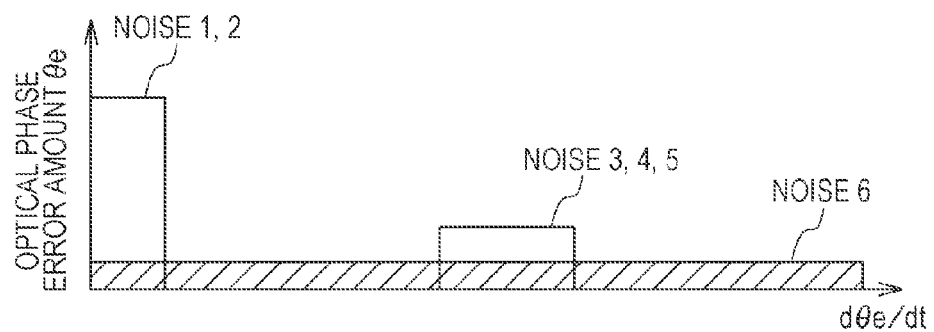
FIGS. 4A and 4B are diagrams illustrating optical phase errors caused by noises.

Since the third to fifth noises correspond to optical phase errors caused by phenomena caused by nonlinear optical effects at a time of optical transmission, the third to fifth noises are generated owing to characteristics of an optical signal and signals of an adjacent channel. Components of the third to fifth noises depend on frequency components including a signal bit sequence. Therefore, as illustrated in FIG. 4A, the third to fifth noises include components of higher frequency bands when compared with the first and second noises.

In the optical phase compensation device 300 according to the comparative example, a single optical phase error calculator is provided for optical phase errors of various frequency bands. The optical phase errors θe' are obtained by performing slip averaging on arbitrary N signal symbols. A process of calculating optical phase errors to be output after the slip averaging is performed on the arbitrary N signal symbols corresponds to a digital filter and means that optical phases are compensated for by a single low-pass filter provided for the optical phase errors.

Figure 4B:
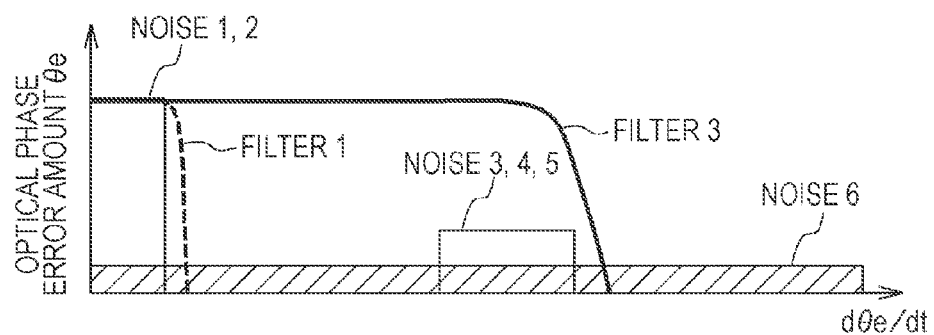

For example, when the first and second noises which are targets of the optical phase compensation in the intradyne detection method are included in a compensation range, a low-pass filter corresponding to a first filter illustrated in FIG. 4B is provided. Furthermore, when high frequency bands such as the third to fifth noises are to be included in the compensation range, the number of signal symbols which are targets of averaging is changed and a wideband low-pass filter represented by a third filter is realized.

However, when the arbitrary number N of signal symbols determined when optical phase errors are calculated is changed to the arbitrary number M of signal symbols (M is not N), proper values of optical phase errors θe' are not output as a result of the calculation immediately after the change. Accordingly, a signal error occurs. As a result, the optical phase errors are not appropriately compensated for and signal quality is deteriorated.

First Embodiment

Figure 6:
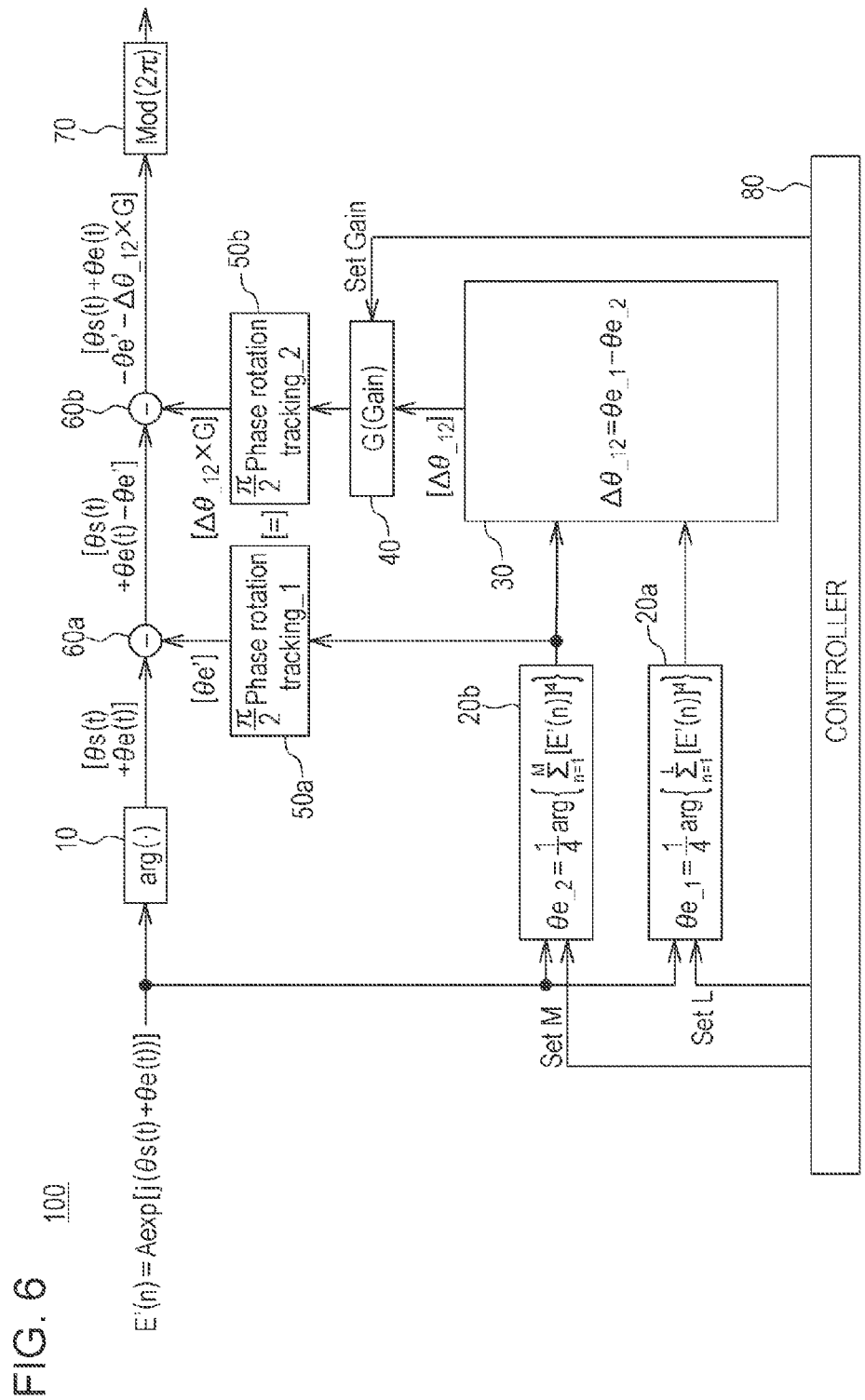
FIG. 6 is a diagram illustrating calculation processes performed by sections of the optical phase compensation device according to the first embodiment.

FIG. 5 is a block diagram illustrating a configuration of an optical phase compensation device 100 according to a first embodiment. The optical phase compensation device 100 includes a deviation angle calculator 10, a first optical phase error calculator 20a, a second optical phase error calculator 20b, a difference calculator 30, a gain controller 40, polarization controllers 50a and 50b, subtractors 60a and 60b, a demodulator 70, and a controller 80. Main signals to be compensated for by the optical phase compensation device 100 are mixed waves including phase modulation components θs(t) of signal symbols and optical phase errors θe(t). FIG. 6 is a diagram illustrating a calculation process performed by sections of the optical phase compensation device 100.

Hereinafter, operation of the optical phase compensation device 100 will be described with reference to FIGS. 5 and 6. The deviation angle calculator 10 extracts phase angles (θs(t)+θe(t)) from the mixed waves. The first and second optical phase error calculators 20a and 20b quadruple the phase angles of the mixed waves so as to obtain θs(t) of π, 3π, 5π, and 7π so that signal phases are removed and "4×θe(t)" remains. The first optical phase error calculator 20a averages L signal symbols of L input signals. The second optical phase error calculator 20b averages M signal symbols of M input signals (M<L). Furthermore, the first and second optical phase error calculators 20a and 20b divides 4×θe by 4 so as to obtain optical phase errors θe'. In this embodiment, "M" corresponds to a value which satisfies a condition in which optical phase errors of the third to fifth noises are not to be compensated for and optical phase errors of the first and second noises are to be compensated for, and "L" correspond to a value which satisfies a condition in which the optical phase errors of the first to fifth noises are to be compensated for.

The difference calculator 30 obtains a difference $\Delta\theta_{\_12}$ ($=\theta e_{\_1}-\theta e_{\_2}$) between a result $\theta e_{\_1}$ of calculation of the first optical phase error calculator 20a and a result $\theta e_{\_2}$ of calculation of the second optical phase error calculator 20b. The gain controller 40 controls a gain G (0 to 1, for example) relative to the difference $\Delta\theta_{\_12}$. The polarization controller 50a controls a deviation angle of the result $\theta e_{\_2}$ of the calculation of the second optical phase error calculator 20b so as to output an optical phase error θe'. The polarization controller 50b controls and outputs a deviation angle of a result $\Delta\theta_{\_12} \times G$ of the calculation of the gain controller 40.

The subtractor 60a subtracts the obtained optical phase error θe' from the phase angles (θs(t)+θe(t)) of the mixed waves. The subtractor 60*b* extracts the signal phases θs(t) by subtracting $\Delta\theta_{-12} \times G$ from a result of the calculation of the subtractor 60*a*. The demodulator 70 demodulates the main signals in accordance with the obtained signal phases θs(t). The controller 80 sets the number of signal symbols to be subjected to averaging performed by the first and second optical phase error calculators 20*a* and 20*b* and the gain G of the gain controller 40.

Next, an example of a procedure of operation of updating characteristics of low-pass filters of the first and second optical phase error calculators 20*a* and 20*b* will be described. As an example, the process starts in a state in which service of a line is launched and the gain G of the gain controller 40 is set to 0. A state in which optical phase errors are compensated for by the second optical phase error calculator 20*b* is changed to a state in which optical phase errors are compensated for by a low-pass filter characteristic determined by the first optical phase error calculator 20*a*.

Specifically, the controller 80 sets the number of signal symbols of averaging targets of the second optical phase error calculator 20*a* to an arbitrary number L. Next, the gain G which is set to 0 in advance is gradually incremented from 0 to 1 (antilogarithm) by 0.1 per step of the gain. The controller 80 terminates the operation when the gain G reaches 1. According to this operation procedure, the low-pass filter characteristic of the second optical phase error calculator 20*b* is gradually changed to the low-pass filter characteristic of the first optical phase error calculator 20*a* without interrupting the frequency offset compensation.

The same result is obtained when "$A\theta e_{-12} = \theta e_{-1} - \theta e''''$" and "G: 0→1" are assigned to outputs "[θs(t)+θe(t)−θe'−Δθ$_{-12}$×G]" of the subtractor 60*b*. Specifically, outputs obtained after the optical phase compensation before the operation described above are "[θs(t)+θe(t)−θe']" and outputs obtained after the operation described above are "[θs(t)+θe(t)−θe$_{-1}$]", that is, "[θe']" before the operation is replaced by "[θe$_{-1}$]" after the operation.

Figure 7A:
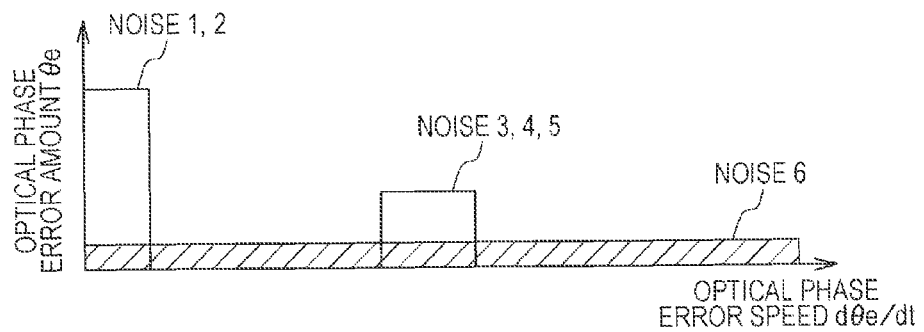
FIGS. 7A to 7C are diagrams illustrating a compensation operation performed when a gain is controlled from 0 to 1.
Figure 7B:
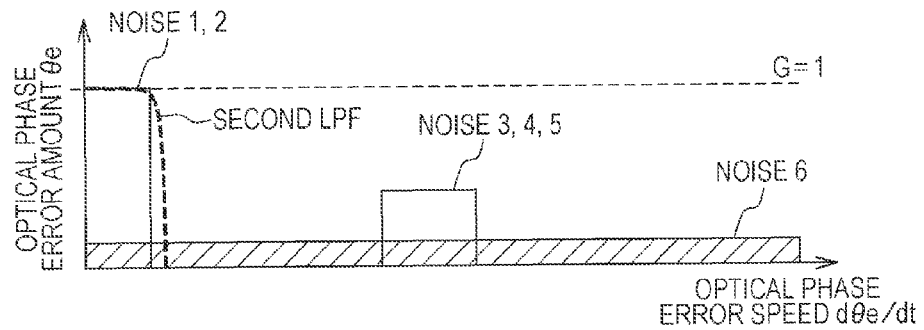
Figure 7C:
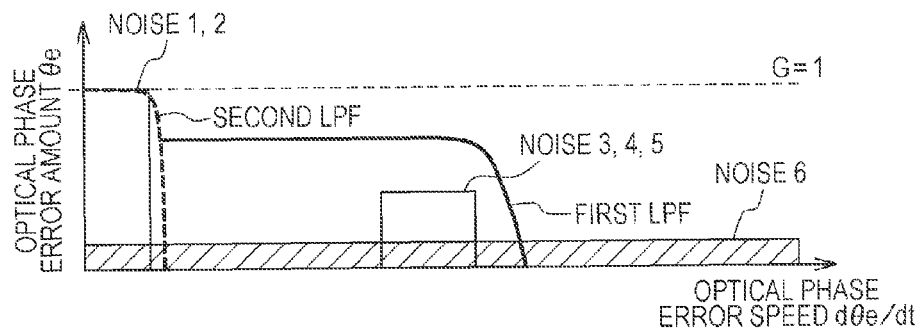

FIGS. 7A to 7C are diagrams illustrating the compensation operation performed when the gain is controlled from 0 to 1. In FIGS. 7A to 7C, axes of abscissa represent a speed of the optical phase errors (dθe/dt) and axes of ordinate represent an amount of the optical phase errors θe. FIG. 7A is a diagram illustrating the optical phase errors caused by the first to sixth noises. As an example, the optical phase errors caused by the third to fifth noises are positioned on a high-frequency side relative to the optical phase errors caused by the first and second noises.

FIG. 7B is a diagram illustrating a state in which the gain G is 0. The low-pass filter characteristic (second LPF) of the second optical phase error calculator 20*b* does not compensate for the optical phase errors caused by the third to fifth noises but compensates for the optical phase errors caused by the first and second noises. FIG. 7C is a diagram illustrating a state in which the gain G is being changed from 0 to 1. As the gain G is gradually changed from 0 to 1, an error amount which is compensated for by the low-pass filter characteristic (first LPF) of the first optical phase error calculator 20*a* is increased. Accordingly, the optical phase errors caused by the first to fifth noises are compensated for.

According to this embodiment, the optical receivers 250 employ the DP-QPSK method, and in a state in which service of the optical receivers 250 is launched and signals are transmitted, the arbitrary number M of signal symbols which has been determined to calculate optical phase errors may be changed to an arbitrary number L (>M). In the comparative example, although characteristics of the low-pass filters of the first and second optical phase error calculators 20*a* and 20*b* may be updated by changing the number of signal symbols to be subjected to averaging, traffic may be interrupted at the time of updating. On the other hand, in this embodiment, the low-pass filter characteristic of the second optical phase error calculator 20*b* may be changed to the low-pass filter characteristic of the first optical phase error calculator 20*a* while the low-pass filter characteristic of the first optical phase error calculator 20*b* is maintained. Specifically, in this embodiment, the optical phase errors may be appropriately compensated for.

Note that, in a state in which the line is activated, frequency components or amounts of the optical phase errors, such as a line configuration of the WDM transmission system, a power of an adjacent channel, and baudrates, assigned to the main signals in the transmission path may be changed, for example. Even in this case, the low-pass filter characteristics of the first and second optical phase error calculators 20*a* and 20*b* are updated without instantly interrupting the line so that appropriate optical phase compensation is performed.

Here, the control of the gain G is not limited to 0.1 per step. The control of the gain G is appropriately set so that outputs of results of calculation of the optical phase errors are not considerably varied in a transient manner. Furthermore, a gain of the gain controller 40 is set as a basic configuration such that a difference [rad] between input optical phase errors is multiplied by a coefficient and a resultant value is output. Update of the coefficient is statically performed in accordance with change of states of the optical phase errors generated in the optical transmission line 230 (for example, frequency in which the network configuration of the WDM transmission system is changed).

This embodiment is described on the assumption that a treble cutoff frequency of the low-pass filter characteristic of the first optical phase error calculator 20*a* is higher than that of the low-pass filter characteristic of the second optical phase error calculator 20*b*, for example. This is because this embodiment is described on the assumption that the treble cutoff frequency of the second optical phase error calculator 20*b* compensates for frequency offset and the optical phase errors generated in the optical transmission line 230 are generally included in a frequency band higher than the treble cutoff frequency.

As described above, the low-pass filter characteristic of the first optical phase error calculator 20*a* may be further changed after the characteristic of the second optical phase error calculator 20*b* is switched to the characteristic of the first optical phase error calculator 20*a*. For example, the gain G of the gain controller 40 may be gradually reduced from 1 to 0 (approximately 0) and the number of signal symbols of the first optical phase error calculator 20*a* is changed, and thereafter, the gain G of the gain controller 40 may be returned from 0 (approximately 0) to 1. The low-pass filter characteristic may be arbitrarily changed in this way.

Second Embodiment

Next, a case where the optical phase errors generated in the optical transmission line 230 are to be compensated for in a wideband (a band widely including a region in which dθ'/dt is small to a region in which dθ'/dt is large). When a large amount of white noise of a broadband such as amplified spontaneous emission (ASE) noise is included, results of calculation of optical phase errors may include errors. Consequently, signal quality may be deteriorated.

For example, when first and second noises which are targets of optical phase compensation are to be included in a compensation range in an intradyne detection method, a low-pass filter, such as a first filter, is provided as illustrated in FIG. 4B. When third to fifth noises in a high frequency band are to be included in the compensation range, a wideband low-pass filter, such as a third filter, is provided. However, when the compensation range is enlarged, optical phase errors caused by broadband noises, such as an ASE noise, are included in a wide band. In this case, the results of calculation of the optical phase errors may include errors and quality of an optical signal may be deteriorated. This is because results θe' obtained by calculating optical phase errors caused by the ASE noise included in the low-pass filter in a state in which the high-frequency white noise is not compensated for have characteristics of an optical phase error versus time data which are considerably different form those of actual optical phase errors θe(t). Accordingly, components of optical phase errors caused by the ASE noise are preferably included in a low-pass filter included in a target range of calculation of optical phase errors as less as possible so that an optical phase is precisely compensated for.

Therefore, in a second embodiment, an optical phase compensation device capable of appropriately compensating for an optical phase error while adverse effect of ASE noise is suppressed and an optical phase compensation method will be described. FIG. 8 is a block diagram illustrating a configuration of an optical phase compensation device 100a according to the second embodiment. FIG. 9 is a diagram illustrating calculation processes performed by sections of the optical phase compensation device 100a. The optical phase compensation device 100a is different from the optical phase compensation device 100 illustrated in FIGS. 5 and 6 in that the optical phase compensation device 100a additionally includes a third optical phase error calculator 20c. The third optical phase error calculator 20c averages N signal symbols of N input signals (N<M<L).

In this embodiment, a polarization controller 50a controls a deviation angle of a result $\theta e\_{\_3}$ of the calculation of the third optical phase error calculator 20c so as to output an optical phase error θe'. A controller 80 sets the number of signal symbols of averaging targets of the third optical phase error calculator 20c to an arbitrary number L.

Here, a gain controller 40 will be described in detail. The first optical phase error calculator 20a samples L signal symbols and performs a slip averaging process. The second optical phase error calculator 20b samples M signal symbols and performs a slip averaging process. It is assumed that L is 12 and M is 8, for example. Furthermore, it is assumed that optical phase errors θe(t) which are superimposed on phases θs(t) of the sampled signals are changed from θe1 to θe12 at time advances.

In the first optical phase error calculator 20a, an optical phase error $\theta e\_{\_1}$ obtained after the slip averaging is performed using 12 signal symbols may be represented by "$\theta e\_{\_1}$=(θe12+θe11+θe10+θe9+θe8+θe7+θe6+θe5+θe4+θe3+θe2+θe1)/12". Similarly, in the second optical phase error calculator 20b, an optical phase error $\theta e\_{\_2}$ obtained after the slip averaging is performed using 8 signal symbols may be represented by "$\theta e\_{\_2}$=(θe12+θe11+θe10+θe9+θe8+θe7+θe6+θe5)/8".

Note that optical phase errors which are superimposed on the 8 signals θe12 to θe5 simultaneously share signals sampled by analog-digital converters (ADCs) included in coherent optical receivers. Therefore, optical phase errors of the first and second optical phase error calculators 20a and 20b represent the same value even in a case of white noise such as ASE noise. In other words, even in a case of white noise, two values which are simultaneously sampled completely synchronized with each other. As a result, optical phase errors included in a frequency band shared by these optical phase error calculators 20a and 20b may be excepted from targets of optical phase error calculation.

A difference (=$\theta e\_{\_1}$−$\theta e\_{\_2}$) between a result of optical phase error calculation obtained when the first optical phase error calculator 20a performs slip averaging and a result of optical phase error calculation obtained when the second optical phase error calculator 20b performs slip averaging is represented as follows. $\theta e\_{\_1}$−$\theta e\_{\_2}$=(θe12+θe11+θe10+θe9+θe8+θe7+θe6+θe5)/8 −(θe12+θe11+θe10+θe9+θe8+θe7+θe6+θe5+θe4+θe3+θe2+θe1)/12=(θe12+θe11+θe10+θe9+θe8+θe7+θe6+θe5)/24−(θe4+θe3+θe2+θe1)/12

Note that θe12 corresponds to an optical phase error in which a time of sampling is latest and θe1 corresponds to an optical phase error in which a time of sampling is earliest, and therefore, the expression above represents a component of the latest optical phase error viewed from the past optical phase error in which the time of sampling is earliest. Furthermore, the optical phase compensation is preferably performed by controlling a gain and a phase taking a case where amplitude (gain) is smaller and a time (phase) is delayed in an output of a digital filter when compared with an actual response into consideration. Moreover, proportional integral derivative (PID) controller is widely used to control the gain (and the phase). The gain controller 40 may perform static control or may perform gain control having coefficients of I and D. The appropriate coefficients are used in a general technique of a digital filter taking a frequency component and a transient response of an optical phase error generated in an optical transmission path into consideration.

According to this embodiment, a characteristic of a bandpass filter may be added while a characteristic of a low-pass filter realized by the third optical phase error calculator 20c is maintained. Specifically, a frequency band (: bandpass filter) of a difference between the low-pass filter characteristic of the first optical phase error calculator 20a and the low-pass filter characteristic of the second optical phase error calculator 20b may be added. Furthermore, a gain G in the added band may be arbitrarily set.

For example, "N" and "M (>N)" correspond to values which satisfy a condition in which optical phase errors of the third to fifth noises are not targets of compensation and optical phase errors of the first and second noises are targets of compensation. Furthermore, "L" preferably corresponds to a value capable of compensating for the optical phase errors of the first to fifth noises.

Figure 10A:
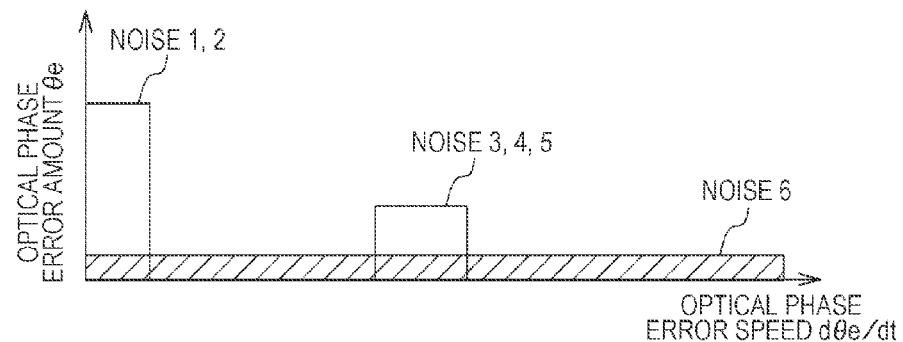
FIGS. 10A to 10C are diagrams illustrating a compensation operation performed when a gain is controlled from 0 to 1.
Figure 10B:
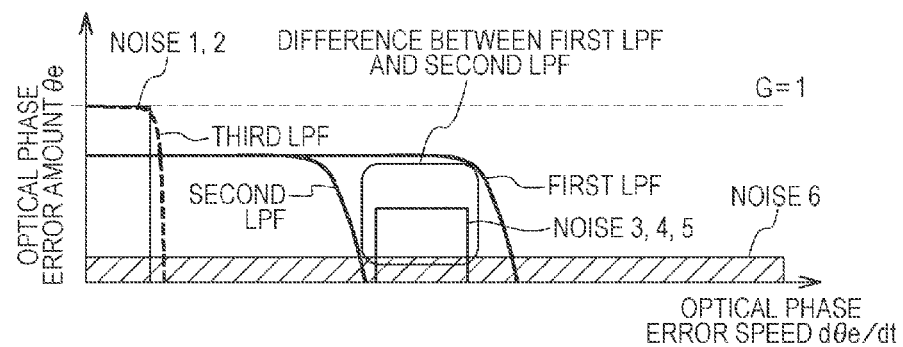
Figure 10C:
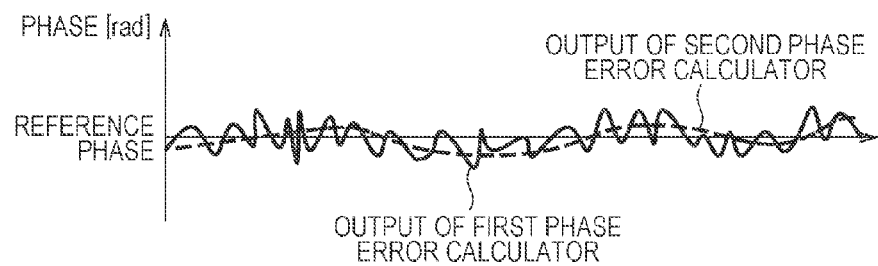

FIGS. 10A to 10C are diagrams illustrating a compensation operation performed when the gain G is changed from 0 to 1. FIG. 10A is a diagram illustrating optical phase errors caused by the first to sixth noises. FIG. 10B is a diagram illustrating a state in which the gain G is being changed from 0 to 1. FIG. 10C is a diagram illustrating examples of results of calculation performed by the first and second optical phase error calculators 20a and 20b.

In FIG. 10B, a bandpass filter characteristic of a difference between the low-pass filter characteristic (first LPF) of the first optical phase error calculator 20a and the low-pass filter characteristic (second LPF) of the second optical phase error calculator 20b is illustrated. As the gain G is gradually changed from 0 to 1, an error amount which is compensated for by the bandpass filter characteristic based on the difference is increased. Accordingly, the optical phase errors caused by the first to fifth noises are compensated for. Furthermore, a band of the low-pass filter of the second optical phase error calculator 20b becomes out of compensation. In this configuration, the optical phase errors caused by the first to fifth noises are compensated for, and meanwhile, a compensation upper limit speed of the third optical phase error calculator 20c to a compensation upper limit speed of the second optical phase error calculator 20b are out of compensation. By this, adverse effect of ASE noise may be suppressed. As a result, accuracy of the compensation of the optical phase errors may be improved.

Here, "N" is preferably determined so that a treble cutoff frequency is set low so that the low-pass filter characteristic of the third optical phase error calculator 20c includes ASE noise as little as possible. Furthermore, "L" is preferably determined so that the low-pass filter characteristic of the first optical phase error calculator 20a includes a highest frequency of an optical phase error in a high band. Furthermore, "M" is preferably determined so that the low-pass filter characteristic of the second optical phase error calculator 20b is equal to or smaller than a lowest frequency of an optical phase error in a high band.

Note that, when three or more optical phase error calculators are provided, a plurality of bandpass filters may be formed. By this, a band in which optical phase errors are more likely to exist is differentiated, and thereafter, a determination as to whether the band is to be included in a range of calculation of optical phase errors may be arbitrarily performed. In this case, a band which is a target of calculation of optical phase errors may be accurately determined and the optical phase errors may be precisely compensated for.

An arbitrary frequency band may be swept so that an amount of optical phase errors included in the band is detected. For example, the controller 80 may set the gain G to 0 so that optical phase compensation of main signals is not affected and arbitrarily sweep L signal symbols and M signal symbols to be subjected to averaging so as to sweep a frequency band which is a target of calculation of optical phase errors. In this case, an amount of optical phase errors included in the target frequency band may be detected, and in other words, the controller 80 may be used as a simple spectrum analyzer for optical phase errors. By this, an amount of various optical phase errors generated in the optical transmission line 230 may be subjected to frequency analysis. A result of the frequency analysis is obtained by the controller 80.

Note that the configuration in which a difference between optical phase errors is amplified by a certain gain and the amplified difference is subtracted from main signals on which the optical phase errors are actually superimposed so that optical phases are compensated for is described in the first and second embodiments. However, it is not necessarily the case that the subtraction is performed for compensation. For example, a configuration in which compensation is performed when a phase error is larger than a predetermined threshold value so that desired signal quality is obtained may be employed.

In the QPSK phase modulation method, a signal has four phase angles at an interval of $\pi/2$ [rad] on a photoelectric field intensity vector filed. In general, when an optical phase error is generated at $\pi/4$ [rad] in a certain signal symbol, eye opening of a demodulated signal becomes zero and the eye opening is deteriorated to some extent in accordance with an angle [rad] of the optical phase error. Accordingly, a threshold value is determined in advance for a degree of deterioration of the eye opening caused by an optical phase error, and only when the threshold value is exceeded, compensation of an optical phase is realized by performing amplification (or attenuation) using a certain gain so that signal quality of a certain degree is ensured.

For example, when an optical phase error calculated from an actual signal is subtracted provided that ASE noise exists, signal quality is not necessarily improved. That is, when an error of calculation of an optical phase error is large and compensation is performed by subtracting the optical error including the calculation error from a signal on which an optical error $\theta e(t)$ is superimposed, the signal may be further deteriorated. To avoid this problem, the controller 80 may perform compensation only when a result $\theta e_{\_12}$ of calculation of a difference of optical phase errors exceeds a predetermined threshold value $\theta e_{\_th}$.

For example, the controller 80 performs compensation using the result $\theta e_{\_12}$ when the following expression is satisfied: $|\theta e_{\_12}|>\theta e_{\_th}$. Otherwise, the compensation is not performed. This is an effective configuration under the condition of a line including a large amount of AES noise in a range of a target of calculation of optical phase errors. Furthermore, when a large number of optical phase errors are assigned to a single polarization signal of an adjacent channel due to XPM in the DP-QPSK method, the optical phase errors may be disproportionately assigned to one of an X polarized wave and a Y polarized wave. On the other hand, in a configuration of the coherent optical receiver employing the intradyne detection method, directions of axes of an X polarized wave and a Y polarized wave of an input optical signal do not substantially coincide with directions of axes of an X polarized wave and a Y polarized wave defined by an interferometer (90° hybrid) included in the optical receiver. Accordingly, it is difficult for the optical receivers to perform compensation on a component of an optical phase error superimposed on the X polarized wave and an optical phase error superimposed on the Y polarized wave in a completely separate manner. This is apparent because an output of ADC sampled by the optical receiver has limited resolution capability in a time axis and an amplitude axis. Even in configurations of optical receivers in the related arts, a calculation error of an optical phase error is generated. Since compensation of an optical phase is performed after a determination as to whether compensation is to be performed by setting the threshold value $\theta e_{\_th}$ in advance taking an amount of a calculation error of an optical phase error into consideration, the compensation is performed when the optical phase error is larger than the predetermined threshold value and signal quality of a specific level may be ensured.

Third Embodiment

Next, optical receivers 250a according to a third embodiment will be described. FIG. 11 is a block diagram illustrating an entire configuration of the optical receivers 250a. In FIG. 11, each of the optical receivers 250a includes an optical front end unit 101, a signal processor 102, an error correction device 103, a controller 104, and the like. The optical front end unit 101 includes a 90° hybrid which performs optical interference on a main signal, a light receiving element which performs photoelectric conversion, and the like. The signal processor 102 digitalizes optical current obtained by the photoelectric conversion so as to obtain a digital signal and demodulates the main signal from the obtained digital signal. The error correction device 103 performs error correction on the demodulated signal. The controller 104 controls an optical phase compensator 105 included in the signal processor 102 in accordance with an error index such as the number of times error correction is performed or a signal error rate obtained by the error correction device 103. The optical phase compensator 105 corresponds to the optical phase compensation device 100 of the first embodiment or the optical phase compensation device 100a of the second embodiment.

For example, when the number of times error correction is performed obtained by the error correction device 103 is reduced, improvement of signal quality is attained. For example, a band to be subjected to compensation performed by the optical phase compensator 105 and a direction and an amount of control of a gain G are controlled in accordance with a direction of increase/decrease of the number of times error correction is performed before and after the band to be subjected to the compensation performed by the optical phase compensator 105 and the gain G are updated and the number of times the error correction is performed. When this operation is repeatedly performed, compensation of an optical phase error may be performed to improve quality of an optical phase of a signal. Not that, as a signal quality monitor, a Q-value monitor, an error count, a bit error rate (BER) monitor, information on distribution of an amplitude level of a signal input to a discriminator which performs soft decision, or the like may be used.

Figure 12:
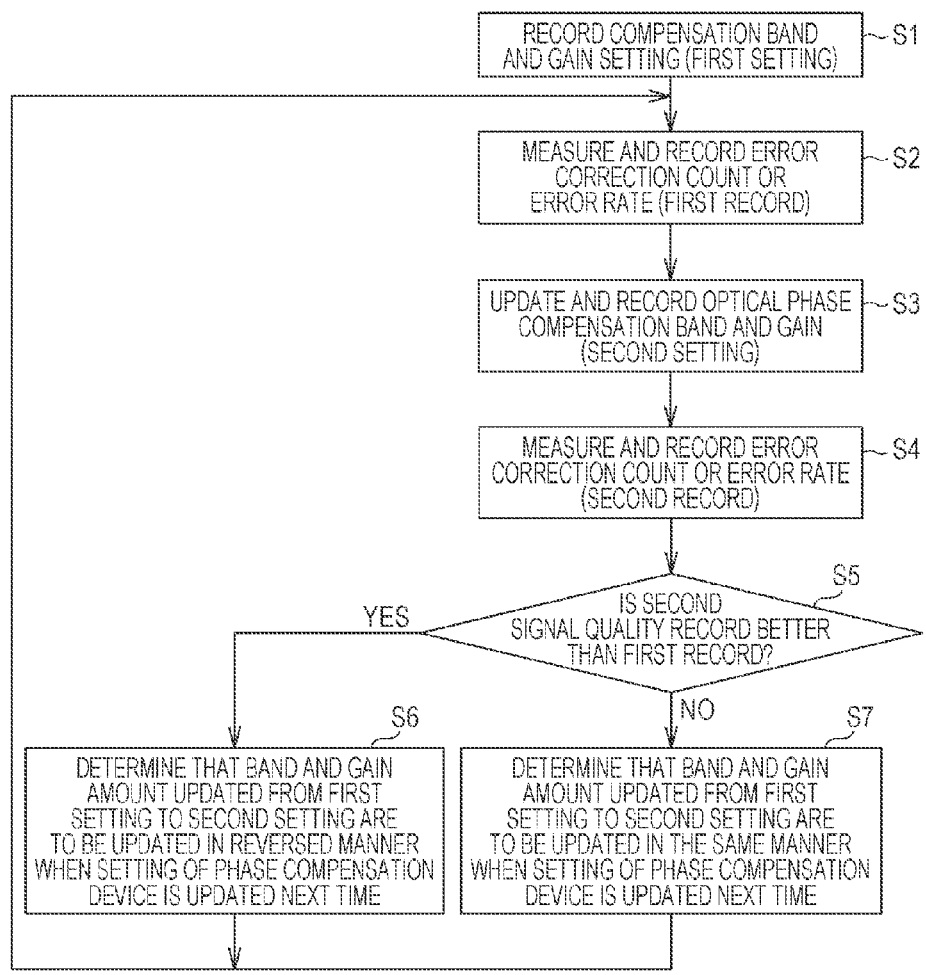
FIG. 12 is a flowchart illustrating an example of control performed by a controller.

FIG. 12 is a flowchart illustrating an example of control performed by the controller 104. As illustrated in FIG. 12, the controller 104 records a compensation band of the optical phase compensator 105 and a setting of the gain G at a current time as a first setting (operation S1). Thereafter, the controller 104 records the number of times error correction is performed or an error rate obtained by the error correction device 103 as a first quality (operation S2). Then the controller 104 updates the compensation band of the optical phase compensator 105 and the gain G and records the compensation band and the gain G as a second setting (operation S3). The controller 104 records the number of times error correction is performed or an error rate obtained by the error correction device 103 as a second quality (operation S4).

The controller 104 determines whether the second quality is better than the first quality (operation S5). Specifically, the controller 104 determines whether the number of times error correction is performed is reduced or whether the error rate is lowered. When the determination is affirmative in operation S5, the controller 104 determines that the band and an amount of the gain G updated from the first setting to the second setting are to be updated in a reversed manner when a setting of the optical phase compensator 105 is updated the next time (operation S6). When the determination is negative in operation S5, the controller 104 determines that the band and the amount of the gain G updated from the first setting to the second setting are to be updated in the same manner when setting of the optical phase compensator 105 is updated the next time (operation S7). After performing operation S5 or operation S6, operation S2 is performed again.

According to this embodiment, signal quality may be improved by comparing signal qualities before and after the setting of the optical phase compensator 105 is updated.

Fourth Embodiment

Figure 13:
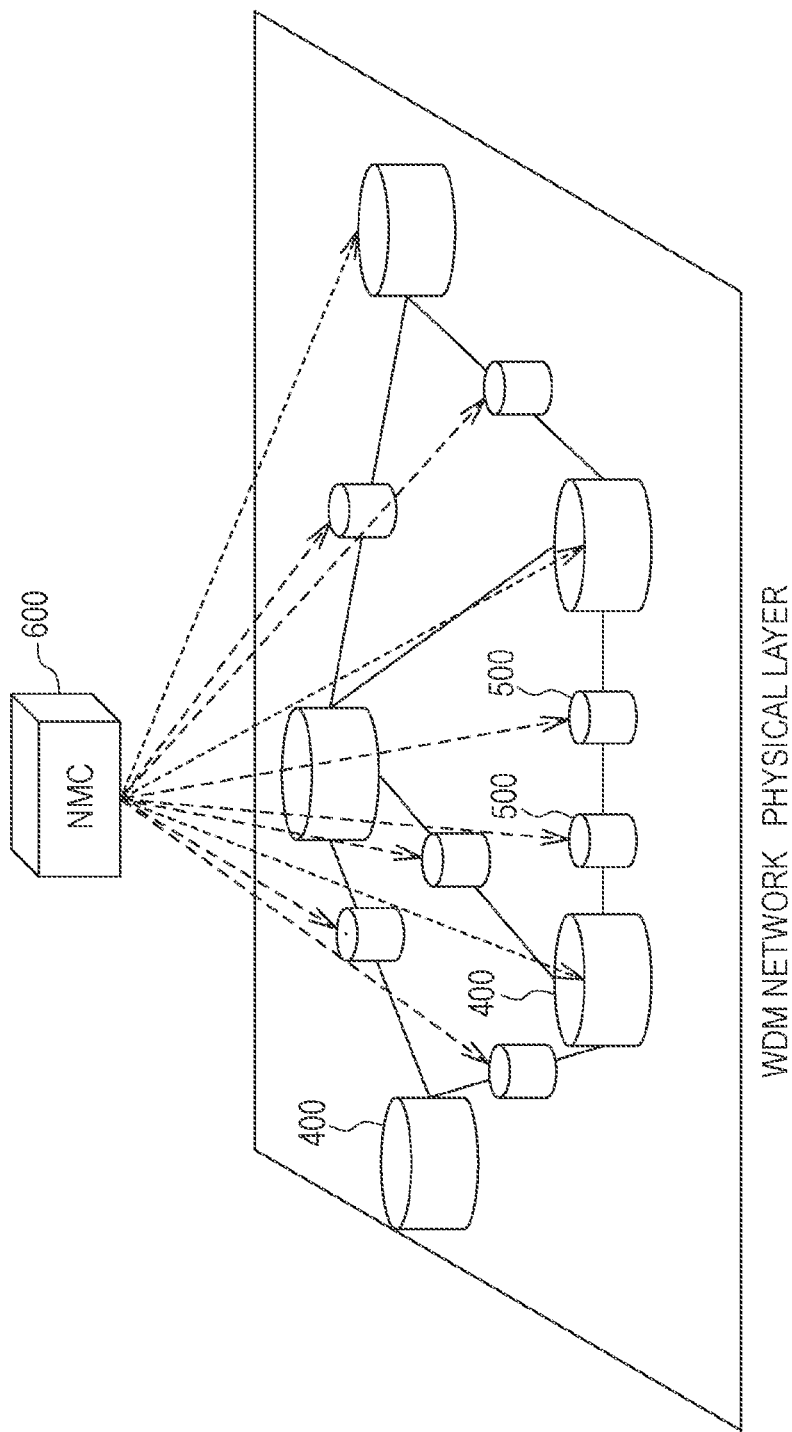
FIG. 13 is a block diagram illustrating an entire configuration of network management.

In a fourth embodiment, network management will be described. FIG. 13 is a block diagram illustrating an entire configuration of network management. As illustrated in FIG. 13, in a WDM network, optical transmitter-receivers/line switching setting stations 400 are connected to one another through at least one optical amplifier setting station 500 using an optical fiber or the like. The optical amplifier setting station 500 includes an optical amplifier which amplifies an optical signal to be relayed. Each of the optical transmitter-receivers/line switching setting stations 400 includes an optical receiver including the optical phase compensation device 100 of the first embodiment or the phase compensation device 100*a* of the second embodiment.

A network management center (hereinafter referred to as NMC) 600 monitors and controls these stations. The NMC 600 controls optical amplification factors of the optical amplifier setting stations 500. The optical amplifier setting stations 500 notify the NMC 600 of the optical amplification factors and optical power monitor values. The NMC 600 performs determination of an optical transmitter-receiver (determination of a baudrate and a modulation method), determination of a wavelength for each channel, and determination of routes of optical lines for the optical transmitter-receivers/line switching setting stations 400. The optical transmitter-receivers/line switching setting stations 400 notify the NMC 600 of states of the optical transmitter-receivers (a baudrate, a modulation method, and an optical input/output power monitor value), a setting of a wavelength for each channel, and a setting of the route of optical lines. Furthermore, the optical transmitter-receivers/line switching setting stations 400 notify the NMC 600 of results of monitoring of optical phase errors detected by the optical receivers. Moreover, the optical transmitter-receivers/line switching setting stations 400 perform frequency analysis on the optical phase errors by the optical receivers which share a node of an optical transmission path and transmit obtained analysis results to the NMC 600.

The NMC 600 collects the analysis results of optical phase errors of the optical receivers and compares the analysis results with a setting of the network and a monitoring state so as to determine an operation for reducing generation of optical phase errors. For example, it is assumed that a large number of optical phase errors are detected in a certain frequency band in optical reception in a line of $\lambda 1$ and a line of $\lambda 3$. In this case, when modulation methods, baudrates, information on monitoring of intensities of optical power of $\lambda 1$ and $\lambda 3$ are compared with a modulation method, a baudrate, information on monitoring of an intensity of optical power of $\lambda 2$, it may be exclusively estimated that XPM is generated since the intensity of the optical power of $\lambda 2$ is large. After the estimation, the NMC 600 reduces (or increases) the optical power of $\lambda 2$, receives analysis results of optical phase errors of $\lambda 1$ and $\lambda 3$ again, and compares states before and after the optical power is changed so as to determine whether signal quality is improved. The NMC 600 repeatedly performs improvement of quality of the optical signal using limited elements included in the optical transmission path which causes the optical phase errors to thereby improve signal quality of the entire WDM transmission system.

Note that a method for compensating for optical phase errors in the entire WDM transmission system is provided by phase compensators included in the optical receivers. Even when optical phases are analyzed in the optical receivers, an optical signal in the WDM transmission system is not affected. Accordingly, compensation may be easily performed in a state in which service is launched, that is, an actual operation state. This technique may be employed to optimize signal quality of the entire WDM transmission system provided that an actual optical fiber transmission path is used before the operation, for example, when the optical fiber transmission path is laid.

Figure 14:
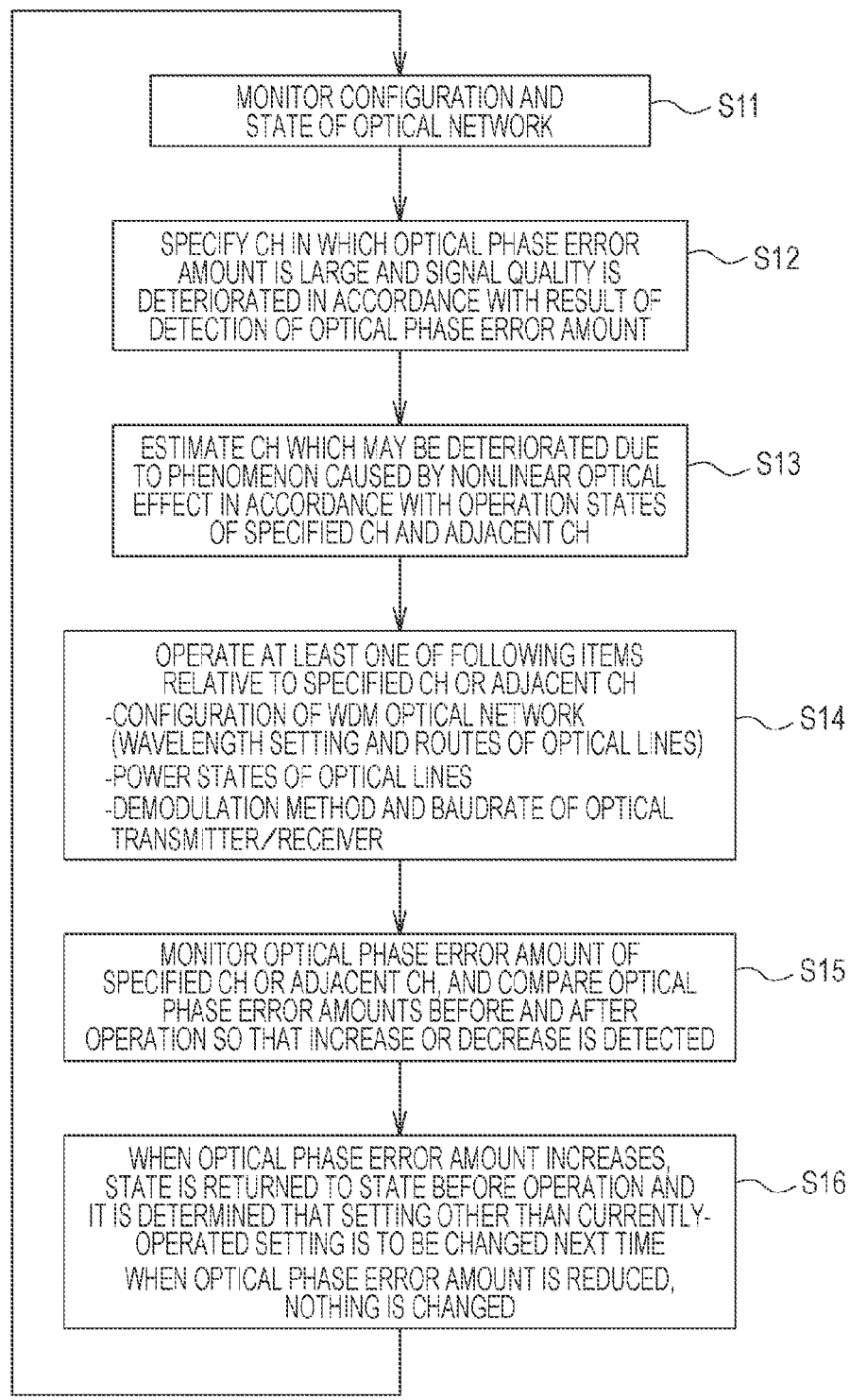
FIG. 14 is a flowchart illustrating an example of control performed by a network management center.

Hereinafter, an example of control performed by the NMC 600 will be described. FIG. 14 is a flowchart illustrating an example of control performed by the NMC 600. In FIG. 14, the NMC 600 monitors a configuration and a state of an optical network (operation S11). The NMC 600 monitors at least a configuration of the WDM optical network (a wavelength setting and an optical line route), a modulation method and baudrates of the optical transmitter-receivers, and a result of detection of an amount of optical phase errors (band and intensity) performed by the optical receivers.

Next, the NMC 600 specifies a channel in which an amount of optical phase errors is large and signal quality is deteriorated in accordance with the result of the detection of the amount of optical phase errors (operation S12). Next, the NMC 600 estimates a channel which may be deteriorated due to a phenomenon caused by a nonlinear optical effect in accordance with operation states of the channel specified in operation S12 and a channel which is adjacent to the specified channel (operation S13).

Next, the NMC 600 controls at least one of following items relative to the specified channel or the adjacent channel: a configuration of the WDM optical network (a wavelength setting and routes of optical lines), power states of the optical lines, and modulation methods and baudrates of the optical transmitter-receivers (operation S14). Subsequently, the NMC 600 monitors an amount of optical phase errors of the specified channel or the adjacent channel, compares amounts of optical phase errors obtained before and after operation S14 with each other so that increase or decrease is detected (operation S15). When the amount of optical phase errors increases, the NMC 600 returns the state after the operation to the state before operation and it is determined that a setting other than the currently-operated setting is to be operated the next time (operation S16). On the other hand, when the amount of optical phase errors is reduced, the NMC 600 does not perform the operation. After operation S16 is performed, operation S11 is performed again.

If an error occurs in a certain optical line, an error may occur in a result of calculation of optical phase errors of an adjacent channel. For example, a value of optical power of the adjacent channel may become larger than an expected value, modulation of an optical transmitter may fail, or a clock system of an optical transmitter may fail. Therefore, instead of a random signal having a signal waveform representing an apparent normal baudrate and an apparent normal bit sequence, a signal in a state in which frequency spectra are uneven is obtained or a state of a signal becomes unstable with time. Abnormality of the adjacent optical transmitter may be detected by analyzing components of optical phase errors generated due to the XPM without monitoring the optical transmitter by directly monitoring such an abnormal optical signal itself. For example, even when it is difficult to monitor an optical transmitter in which an error occurs since the optical transmitter fails, network management may be performed by determining that an optical phase error is generated due to the XPM by analyzing the optical phase error of the adjacent channel.

Figure 15:
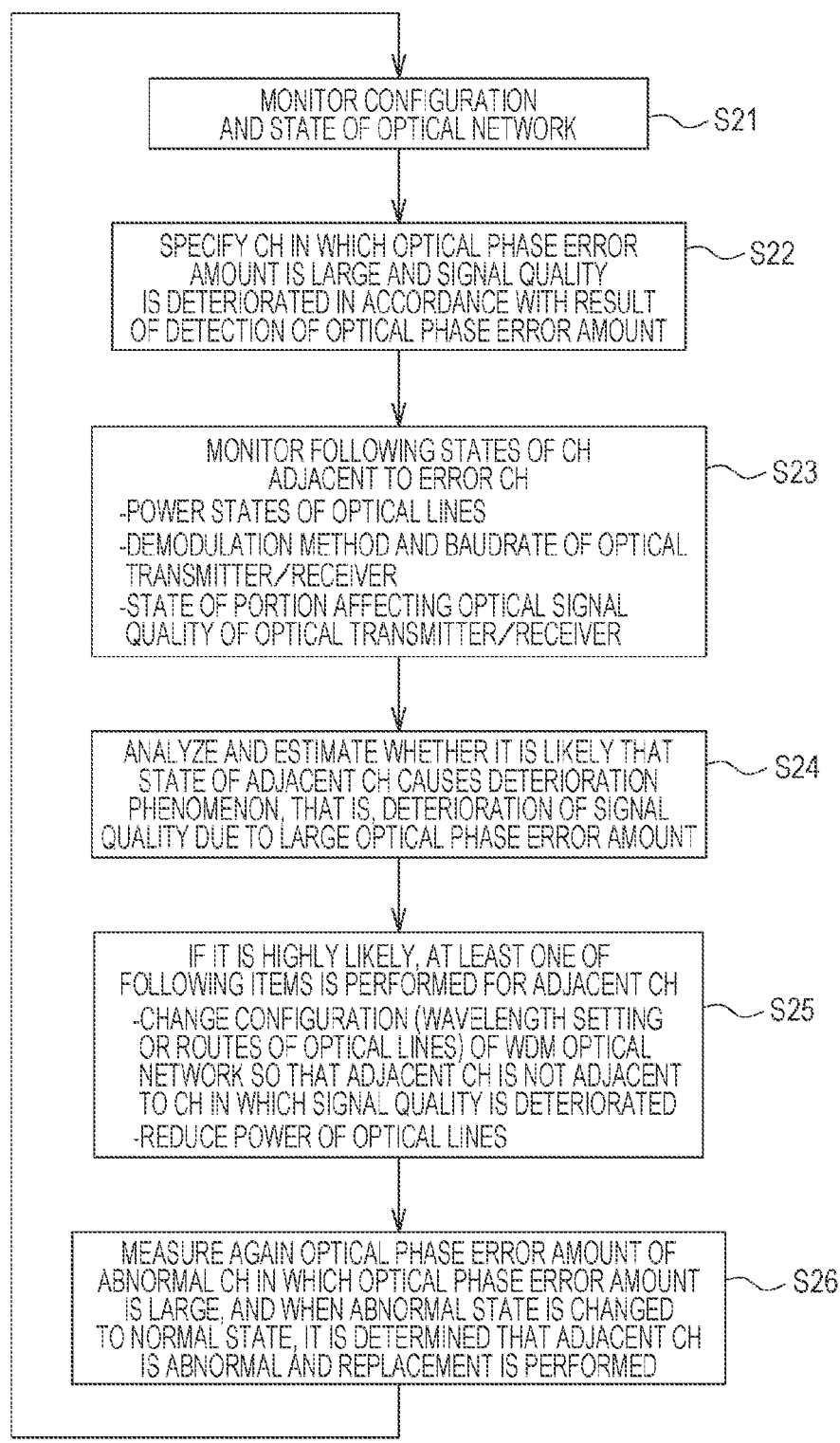
FIG. 15 is a flowchart illustrating another example of control performed by the network management center.

FIG. 15 is a flowchart illustrating another example of control performed by NMC 600. In FIG. 15, the NMC 600 monitors a configuration and a state of the optical network (operation S21). The NMC 600 monitors at least a configuration of the WDM optical network (a wavelength setting and routes of optical lines), modulation methods and baudrates of the optical transmitter-receivers, and a result of detection of amounts of optical phase errors (a band and intensity) detected by the optical receivers.

Next, the NMC 600 specifies a channel in which an amount of optical phase errors is large and signal quality is abnormal in accordance with the result of the detection of the amounts of optical phase errors (operation S22). The NMC 600 monitors a state of power of an optical line of a channel which is adjacent to the abnormal channel, a modulation method and a baudrate of a corresponding one of the optical transmitter-receivers, and a state of a portion of the optical transmitter-receiver which affects optical signal quality (operation S23)

The NMC 600 analyzes and estimates whether it is likely that a state of the adjacent channel causes a deterioration phenomenon, that is, deterioration of signal quality due to a large amount of optical phase errors (operation S24). When the determination is affirmative, the NMC 600 performs at least one of the operations below on the adjacent channel (operation S25). Specifically, the operations include change of the configuration (a wavelength setting or routes of optical lines) of the WDM optical network so that the adjacent channel is not disposed adjacent to the channel in which the optical phase error is abnormal and reduction of power of the optical line. Then the NMC 600 measures again an amount of optical phase errors of the abnormal channel in which the amount of optical phase errors is large, and when the abnormal state is changed to a normal state, it is determined that the adjacent channel is abnormal and replacement is performed (operation S26). After operation S26 is performed, operation S21 is performed again.

According to this embodiment, the optical network may be appropriately managed in accordance with optical phase errors obtained by the optical phase compensation device.

Although an optical polarization division multiplexing QPSK method using four-level phase modulation is employed in the foregoing embodiments, other phase modulation methods may be used. Note that, in the first and second embodiments, the controller 80 functions as a changing unit which changes one of the number L of signal symbols and the number M of signal symbols. Furthermore, the controller 80 functions as an obtaining unit which obtains a result of the frequency analysis of optical phase errors of a main signal in accordance with a result of sweeping performed by the changing unit on at least one of the L signal symbols and the M signal symbols. Moreover, in the third embodiment, the error correction device 103 and the controller 104 function as an obtaining unit which obtains an error rate of a demodulated signal. In addition, in the fourth embodiment, the NMC 600 functions as an analysis device which analyzes optical phase errors in accordance with an amount of optical phase errors compensated for by the optical phase compensation device.

Note that, in the DP-QPSK described above, a rate of optical power of an X polarized wave to optical power a Y polarized wave may be defined as follows: (an amplitude [W] of optical intensity modulation of a control signal per optical power 1 [W] of a main signal of the polarized wave)=N<<1. An optical receiver including one of the phase compensators described above may have a configuration in which the rate of the optical power of the X polarized wave to the optical power of the Y polarized wave is calculated from amplitude which has been subjected to intensity modulation. Furthermore, the optical receiver may have a configuration in which it is determined whether a detected amplitude value is stable in a detection process. In this case, the optical receiver may include a function of suppressing malfunction of feedback control operating such that, when the detected amplitude value is not stable, the detected value is invalidated, and thereafter, update of an operation value of feedback control is temporarily stopped. Furthermore, a determination as to whether the optical power of the main signal reaches a threshold value of an upper limit or a lower limit may be performed by monitoring. When the optical power reaches the threshold value and when the optical power exceeds an amount of estimated PDL (polarization dependent loss) in an optical transmission line, an alert may be sounded.

Although the embodiments of the present technique have been described hereinabove, the present technique is not limited to the specific embodiments and various modifications and changes may be made within the scope of the present technique described in claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical phase compensation device included in an optical receiver employing an intradyne detection method, comprising:
    a first optical phase error calculator configured to calculate a first optical phase error by averaging signal symbols of a first number of input main signals;
    a second optical phase error calculator configured to calculate a second optical phase error by averaging signal symbols of a second number of the main signals, wherein the second number is smaller than the first number; and
    a subtractor configured to subtract, from optical phase components of the main signals, one of a difference between the first optical phase error and the second optical phase error and a value obtained by multiplying the difference by a gain relative to the difference.

2. The optical phase compensation device according to claim 1, wherein the subtractor further subtracts the second optical phase error from the optical phase components of the main signals.

3. The optical phase compensation device according to claim 1, further comprising:
    a third optical phase error calculator configured to calculate a third optical phase error by averaging signal symbols of a third number of the main signals, wherein the third number is smaller than the second number,
    wherein the subtractor further subtracts the third optical phase error from the optical phase components of the main signals.

4. The optical phase compensation device according to claim 1, wherein the subtractor does not subtract, from the optical phase components of the main signals, the difference and the value obtained by multiplying the difference by the gain when the difference is smaller than a predetermined value.

5. The optical phase compensation device according to claim 1, further comprising:
    a changing unit configured to change at least one of the first number and the second number.

6. The optical phase compensation device according to claim 5, further comprising:
    an obtaining unit configured to obtain a result of frequency analysis of optical phases error of the main signals in accordance with a result of sweeping performed by the changing unit on at least a frequency band of the signal symbols of the first number and the signal symbols of the second numbers.

7. An optical receiver employing an intradyne detection method, comprising:
    a first optical phase error calculator configured to calculate a first optical phase error by averaging signal symbols of a first number of input main signals;
    a second optical phase error calculator configured to calculate a second optical phase error by averaging signal symbols of a second number of the main signals, wherein the second number is smaller than the first number;
    a subtractor configured to subtract, from optical phase components of the main signals, one of a difference between the first optical phase error and the second optical phase error and a value obtained by multiplying the difference by a gain relative to the difference;
    a demodulator configured to demodulate the main signals in accordance with signal phases obtained by the subtractor; and
    an obtaining unit configured to obtain an error index of the main signals demodulated by the demodulator before and after the difference or the value obtained by multiplying the difference by the gain is subtracted from the optical phase components of the main signals.

8. An optical phase compensation method employed in an optical receiver employing an intradyne detection method, comprising:
    calculating a first optical phase error by averaging signal symbols of a first number of an input main signal;
    calculating a second optical phase error by averaging signal symbols of a second number of the main signal, wherein the second number is smaller than the first number; and
    subtracting, from optical phase components of the main signals, one of a difference between the first optical phase error and the second optical phase error and a value obtained by multiplying the difference by a gain relative to the difference.

* * * * *